United States Patent
Li et al.

(10) Patent No.: US 12,489,150 B2
(45) Date of Patent: Dec. 2, 2025

(54) METHOD, APPARATUS, AND DEVICE FOR MANAGING BATTERIES

(71) Applicant: GOTION, INC., Fremont, CA (US)

(72) Inventors: Xiaojun Li, Fremont, CA (US); Jianwei Li, Fremont, CA (US); Rick Rajaie, Fremont, CA (US)

(73) Assignee: GOTION, INC., Fremont, CA (US)

( * ) Notice: Subject to any disclaimer, the term of this patent is extended or adjusted under 35 U.S.C. 154(b) by 941 days.

(21) Appl. No.: 17/685,061

(22) Filed: Mar. 2, 2022

(65) Prior Publication Data
US 2022/0285743 A1  Sep. 8, 2022

(30) Foreign Application Priority Data
Mar. 3, 2021 (CN) .......................... 202110233009.7

(51) Int. Cl.
*H01M 10/42* (2006.01)

(52) U.S. Cl.
CPC .. *H01M 10/425* (2013.01); *H01M 2010/4271* (2013.01)

(58) Field of Classification Search
CPC ....... H01M 10/425; H01M 2010/4271; H01M 2010/4278
See application file for complete search history.

(56) References Cited

U.S. PATENT DOCUMENTS

| | | | |
|---|---|---|---|
| 2012/0116699 A1* | 5/2012 | Haag | H01M 10/425 429/61 |
| 2013/0164567 A1* | 6/2013 | Olsson | H01M 10/425 429/93 |

FOREIGN PATENT DOCUMENTS

CN         202474128 U   * 10/2012

OTHER PUBLICATIONS

Machine translation CN202474128U (Year: 2012).*

* cited by examiner

*Primary Examiner* — Victoria H Lynch
(74) *Attorney, Agent, or Firm* — LOZA & LOZA, LLP; Michael Fedrick

(57) ABSTRACT

The embodiments in this disclosure provide a method, apparatus, and device for managing batteries. The method comprises: collecting battery cell data for respective battery cells, which indicates statuses of the battery cells; sending the battery cell data to a data processing device to enable the data processing device to determine the configuration of a battery pack based on the battery cell data; configuring, upon receipt of battery pack configuration information from the data processing device, the battery cells into at least one battery pack based on the battery pack configuration information; and acquiring battery pack data for the battery pack, which indicates the status of the battery pack and feeding the battery pack data back to the data processing device to enable the data processing device to determine a management mode for the battery pack based on the battery pack data. The disclosed method achieves configuration and wireless management of the batteries and improves the adaptability of battery management.

15 Claims, 3 Drawing Sheets

METHOD, APPARATUS, AND DEVICE FOR MANAGING BATTERIES

CROSS-REFERENCE TO RELATED APPLICATIONS

This application claims the priority of Chinese Patent Application No. 202110233009.7, filed on Mar. 3, 2021, entitled "Battery management method, device and equipment", the entire contents of which are incorporated herein by reference.

TECHNICAL FIELD

The embodiments of this disclosure relate to the technical field of battery management, and in particular, to a method, apparatus, and device for managing batteries.

BACKGROUND

With the rapid development of electric vehicles and energy storage systems, energy storage batteries have also been subjected to extensive development and application. The use of batteries brings about a large amount of data such as cell voltage, cell temperature, battery pack voltage, battery pack temperature. Therefore, a battery management system is usually provided in the battery pack to collect battery data and manage the batteries based on the battery data.

However, the conventional battery management systems are basically capable of only some simple judgment processes based on preset instructions and do not have access to mass data. As a result, the battery managements implemented by the conventional battery management systems often fail to meet the requirements for practical application. Therefore, there is a need for a technical solution that can utilize all available battery data to manage batteries accurately and effectively.

SUMMARY

An objective of the embodiments in this disclosure is to provide a method, apparatus, and device for managing batteries, which achieve consistent and efficient assembly and management of battery packs.

An embodiment of this disclosure provides a method for managing batteries, comprising: collecting battery cell data for respective battery cells, which indicates statuses of the battery cells; sending the battery cell data to a data processing device to enable the data processing device to determine a configuration of a battery pack based on the battery cell data; configuring, upon receipt of battery pack configuration information from the data processing device, the battery cells into at least one battery pack based on the battery pack configuration information; acquiring battery pack data for the battery pack, which indicates a status of the battery pack, and feeding the battery pack data back to the data processing device, to enable the data processing device to determine a management mode for the battery pack based on the battery pack data.

An embodiment of this disclosure provides an apparatus for managing batteries, comprising: a battery cell data collecting module configured to collect battery cell data for respective battery cells, which indicates statuses of the battery cells; a battery cell data sending module configured to send the battery cell data to a data processing device, to enable the data processing device to determine a configuration of a battery pack based on the battery cell data; a battery pack configuring module configured to configure, upon receipt of battery pack configuration information from the data processing device, the battery cells into at least one battery pack based on the battery pack configuration information; and a battery pack data acquiring module configured to acquire battery pack data for the battery pack, which indicates a status of the battery pack, and feed the battery pack data back to the data processing device to enable the data processing device to determine a management mode for the battery pack based on the battery pack data.

An embodiment of this disclosure provides a device for managing batteries, comprising a detection module, a data transmission module, a memory, and a processor, the detection module is configured to acquire battery cell data and/or battery pack data; the data transmission module is configured to communicate with a data processing device; the memory is configured to store the battery cell data and/or battery pack data; and the processor is configured to execute preset program instructions to implement steps of: collecting battery cell data for respective battery cells, which indicates statuses of the battery cells; sending the battery cell data to the data processing device to enable the data processing device to determine a configuration of a battery pack based on the battery cell data; configuring, upon receipt of battery pack configuration information from the data processing device, the battery cells into at least one battery pack based on the battery pack configuration information; acquiring battery pack data for the battery pack, which indicates a status of the battery pack, and feeding the battery pack data back to the data processing device to enable the data processing device to determine a management mode for the battery pack based on the battery pack data.

An embodiment of this disclosure provides a method for managing batteries, comprising: receiving battery cell data sent from a battery management device, which indicates statuses of battery cells; generating, based on the battery cell data, battery pack configuration information, which specifies battery cells making up a battery pack; feeding the battery pack configuration information back to the battery management device, to enable the battery management device to configure the battery cells into at least one battery pack based on the battery pack configuration information; and determining, upon receipt of battery pack data from the battery management device, a management mode for the battery pack based on the battery pack data, wherein the battery pack data indicates a status of the battery pack.

An embodiment of this disclosure provide an apparatus for managing batteries, comprising: a battery cell data receiving module configured to receive battery cell data sent from a battery management device, which indicates statuses of battery cells; a battery pack configuration information generating module configured to generate, based on the battery cell data, battery pack configuration information which specifies battery cells making up a battery pack; a battery pack configuration information feedbacking module configured to feed the battery pack configuration information back to the battery management device, to enable the battery management device to configure the battery cells into at least one battery pack based on the battery pack configuration information; and a management mode determining module configured to determine, upon receipt of the battery pack data from the battery management device, a management mode for the battery pack based on the battery pack data, wherein the battery pack data indicates a status of the battery pack.

An embodiment of this disclosure provides a data processing device comprising a memory and a processor, the memory is configured to store computer program instructions, the processor is configured to execute the computer program instructions to implement steps of: receiving battery cell data sent from a battery management device, which indicates statuses of battery cells; generating, based on the battery cell data, battery pack configuration information which specifies battery cells making up a battery pack; feeding the battery pack configuration information back to the battery management device, to enable the battery management device to configure the battery cells into at least one battery pack based on the battery pack configuration information; and determining, upon receipt of battery pack data from the battery management device, a management mode for the battery pack based on the battery pack data, wherein the battery pack data indicates a status of the battery pack.

According to the embodiments of this disclosure, the battery cell data is sent to a data processing device upon receipt thereof, and the data processing device determines the configuration of the battery pack based on the battery cell data and feeds the battery pack configuration information for configuring the battery pack to the battery management device, the battery management device is enabled to configure the battery cells into at least one battery pack and receives data for the battery pack to implement management of the battery pack. According to the embodiments, the battery pack is managed by the data processing device, therefore in the case that the battery pack's own management apparatus does not have sufficient data access and capability to manage the battery pack, the data may be transmitted to other devices for remote analysis by the data processing device, and the results may be fed back to the battery management device for remote management. In this way, the management of the battery pack is improved, resulting in enhanced stability of the battery management system, and improved user experience of the battery.

BRIEF DESCRIPTION OF DRAWINGS

To explain the technical solutions of the embodiments in this disclosure or the prior art more clearly, a brief introduction will be made to the drawings for the embodiments or the prior art. It is to be understood that the drawings described below involve only some embodiments described in this disclosure, and those skilled in the art may arrive at drawings for other embodiments from this disclosure without creative efforts.

DESCRIPTION OF EMBODIMENTS

A clear and complete description will be made to the technical solutions of the embodiments in this disclosure in conjunction with the drawings. It can be understood that the described embodiments are only a part, rather than all, of the embodiments of this invention and that all other embodiments obtained by those skilled in the art from this disclosure without creative efforts shall fall within the scope of this disclosure.

To better understand the inventive concept, a system for managing batteries according to an embodiment of this disclosure is to be described first. The system for managing batteries may include a battery management device and a data processing device.

The battery management device may be a device provided on a battery pack and managing the batteries directly. For example, the battery management device may be a device corresponding to a new energy management device (BMS) or a thermal management system, collecting battery data and managing and controlling the battery status directly.

The data processing device may be a device that stores data and analyzes and processes the data. For example, the data processing device may perform calculations based on big data and provide related cloud services. In other words, the data processing device may be a cloud computing device. Preferably, the communication between the data processing device and the battery management device is wireless, ensuring the stability of the communication between these two devices.

Figure 1:
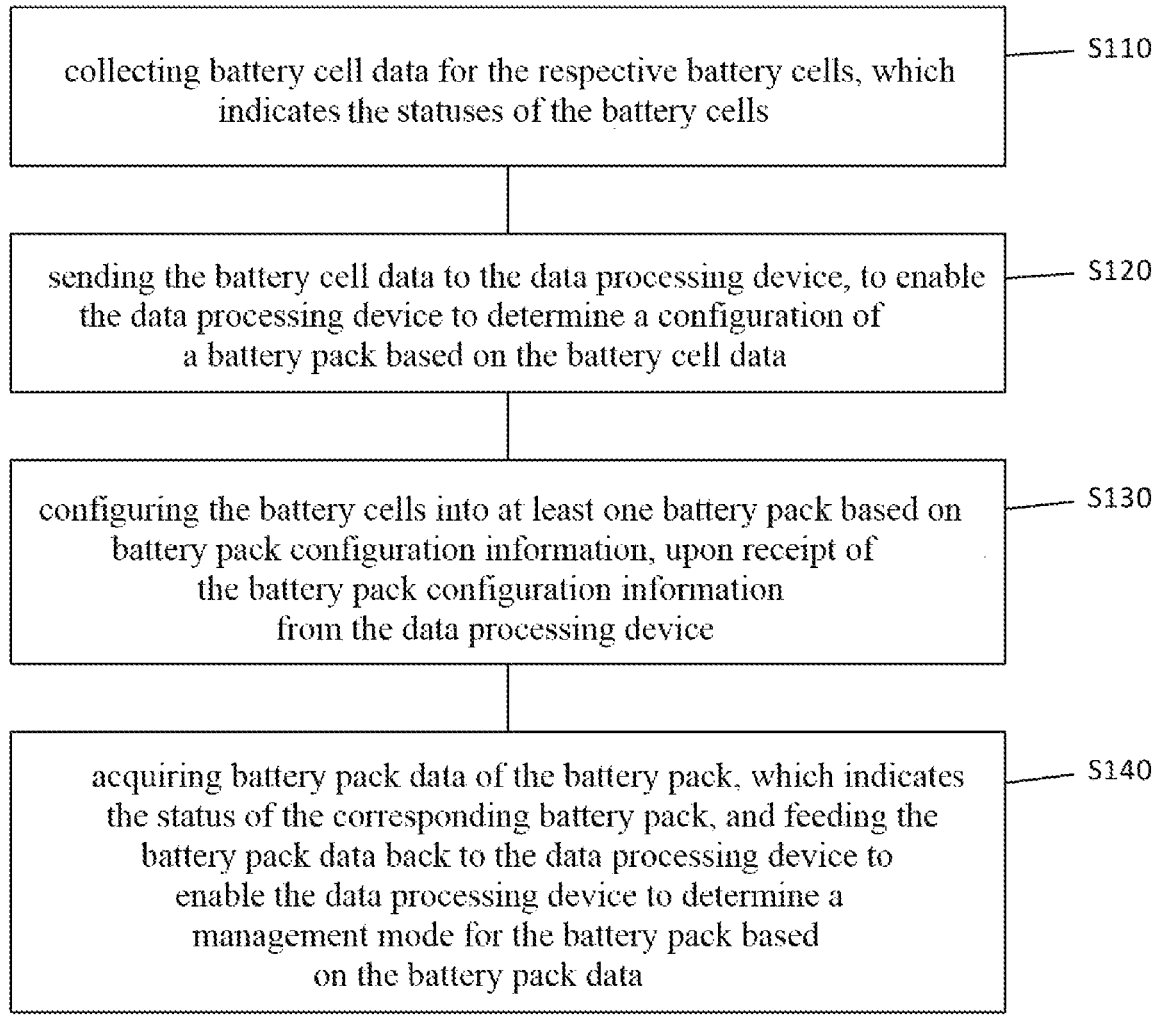
FIG. 1 is a flow chart of a method for managing batteries according to an embodiment of this disclosure.

On the basis of the battery management system described above, a method for managing batteries according to an embodiment of this disclosure is to be described. The entity for executing the method may be the battery management device. As shown in FIG. 1, the method for managing batteries may comprise the following steps.

S110: collecting battery cell data for the respective battery cells, which indicates statuses of the battery cells.

The battery cell may be the smallest management unit for managing the batteries. For example, the battery cell may be a cell or a module composed of cells. There is no limitation in this respect in practical applications.

A data collection module provided on the battery management device may collect the data of each battery cell to obtain the corresponding battery cell data. The battery cell data may indicate the status of each battery cell. Specifically, the battery cell data may be at least one of battery cell voltage, battery cell current, battery cell temperature, and battery cell location. The battery cell location may indicate the geographic location of the battery cell or indicate the relative location of the battery cell on the application device or the location of the battery cell relative to other battery cells. There is no limitation in this respect.

The specific method for collecting the battery cell data may depend on the practical requirements. For example, data may be collected by a corresponding sensor. There is no limitation in this aspect.

S120: sending the battery cell data to the data processing device, to enable the data processing device to determine a configuration of a battery pack based on the battery cell data.

After collection of the battery cell data, the battery management device may send the battery cell data to the data processing device.

In some embodiments, the battery may be an onboard battery, in which case the vehicle may be bumpy during driving. Therefore wires may be damaged in the case of wired data transmission, leaving stability and accuracy of data transmission jeopardized. Therefore, it is preferable to send the battery cell data via a wireless port by wireless transmission to alleviate the impact of the environment on the data transmission.

After the battery cell data is transmitted to the data processing device, the data processing device may determine a configuration of the battery pack based on the battery cell data. Since a battery pack may include a plurality of battery cells, it is crucial to determine the configuration of the battery pack based on the battery cells included in the battery to manage each battery pack effectively. Conventional battery management devices cannot effectively determine the configuration of the battery pack based on the stored data or instruction information. Therefore, the battery cell data may be sent to a data processing device with strong data processing capabilities to configure the battery pack.

Upon receipt of the battery cell data, the data processing device may configure the battery pack based on the battery cell data according to preset rules. For example, a battery pack configuration model may be trained in advance with sample data, and then the configuration of the battery packs may be determined with the battery pack configuration model. In practical applications, the specific method for generating the battery pack configuration information may depend on the practical requirements. There is no limitation in this respect.

S130: configuring the battery cells into at least one battery pack based on battery pack configuration information, upon receipt of the battery pack configuration information from the data processing device.

The data processing device may, after generating the battery pack configuration information, feed the battery pack configuration information to the battery management device through a data transmission path. Accordingly, the battery management device may receive the battery pack configuration information via a wireless port.

Upon receipt of the battery pack configuration information, the battery management device may configure the battery pack based on the battery pack configuration information. In practical applications, each battery cell may have an associated individual management module before being configured into the battery pack, while after the battery cells are configured into a battery pack, an associated management module may be allocated only for the configured battery pack so as to achieve collective management and control of the battery cells in the battery pack, and to reduce consumption of management resources.

The specific manner for allocating and configuring battery packs may depend on the practical requirements. Details are omitted herein.

S140: acquiring battery pack data of the battery pack, which indicates the status of the corresponding battery pack, and feeding the battery pack data back to the data processing device to enable the data processing device to determine a management mode for the battery pack based on the battery pack data.

After the battery pack is configured, the battery management device may perform corresponding management based on the configured battery pack. Specifically, the battery management device may acquire battery pack data of the battery pack, which may indicate the status of the corresponding battery pack. Specifically, the battery pack data may be at least one of battery level, health condition, battery power, and remaining charging time.

The battery management device may send the battery pack data to the data processing device to enable the data processing device to determine a management mode for the battery pack based on the battery pack data.

In some embodiments, determining the management mode for the battery pack may comprise estimating battery failure based on the battery pack data and sending corresponding warning information to a user to notify the battery failure. The battery failure may include at least one of the following: low battery level and battery thermal runaway so as to achieve remote monitoring of the status of the battery pack by the data processing device and prevention of the safety risks of the battery pack. In practical applications, the battery pack may also be managed and controlled in other ways, details of which are omitted herein.

As described above, the collected battery cell data is sent to the data processing device. The data processing device determines the configuration of the battery pack based on the battery cell data and feeds the corresponding battery pack configuration information for configuring the battery pack to the battery management device to enable the battery management device to configure the battery cells into at least one battery pack, the data processing device further receive data for the battery pack to implement management of the battery pack. According to the above method, the battery pack is managed by the data processing device, therefore in the case that the battery pack's own management device does not have sufficient data access and capability to manage the battery pack, the data may be transmitted to other devices for remote analysis by the data processing device, and the results may be fed back to the battery management device for remote management. In this way, the management of the battery pack is improved, resulting in enhanced stability of the battery management system, and improved user experience of the battery.

Figure 2:
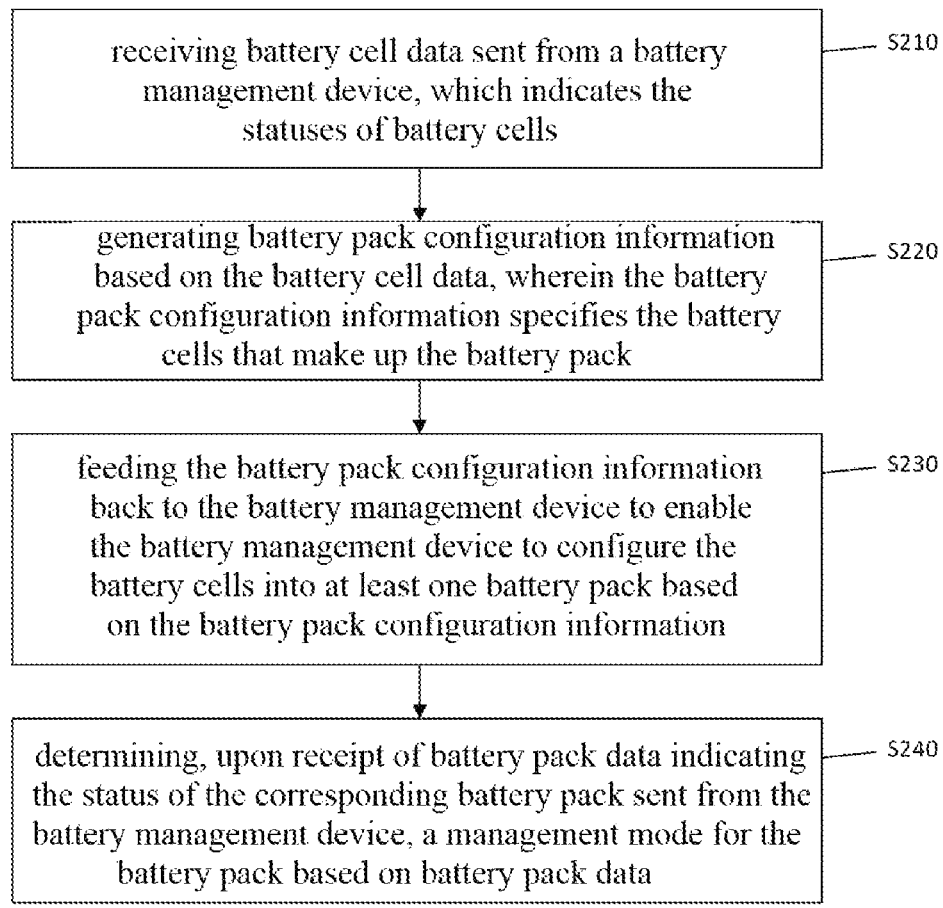
FIG. 2 is a flow chart of a method for managing batteries according to another embodiment of this disclosure.

On the basis of the method for managing batteries corresponding to FIG. 1, a description is to be made to another method for managing batteries, which may be executed by the data processing device. As shown in FIG. 2, the method for managing batteries comprises the following steps.

S210: receiving battery cell data sent from a battery management device, which indicates the statuses of battery cells.

Reference may be made to steps S110 and S120 for detailed description for this step, which is omitted herein.

S220: generating battery pack configuration information based on the battery cell data, wherein the battery pack configuration information specifies the battery cells that make up the battery pack.

Reference may be made to step S130 for a detailed description of this step, which is omitted herein.

S230: feeding the battery pack configuration information back to the battery management device to enable the battery management device to configure the battery cells into at least one battery pack based on the battery pack configuration information.

Reference may be made to step S130 for a detailed description of this step, which is omitted herein.

S240: determining, upon receipt of battery pack data indicating the status of the corresponding battery pack sent from the battery management device, a management mode for the battery pack based on battery pack data.

Reference may be made to step S140 for detailed description for this step, which is omitted herein.

Figure 3:
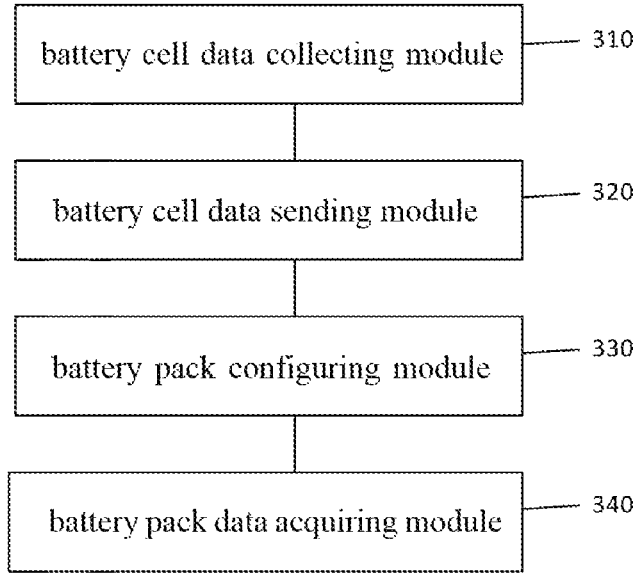
FIG. 3 is a module diagram of an apparatus for managing batteries according to an embodiment of this disclosure.

On the basis of the method for managing batteries corresponding to FIG. 1, a battery management apparatus according to an embodiment of this disclosure is to be described. As shown in FIG. 3, the battery management apparatus may include the following modules:

a battery cell data collecting module 310 for collecting battery cell data of the respective battery cells, which indicates the statuses of the battery cells;

a battery cell data sending module 320 for sending the battery cell data to a data processing device to enable the data processing device to determine a configuration of a battery pack based on the battery cell data;

a battery pack configuring module 330 for configuring, upon receipt of the battery pack configuration information sent from the data processing device, the battery cells into at least one battery pack based on the battery pack configuration information;

a battery pack data acquiring module 340 for acquiring battery pack data for the battery pack, which indicates the status of the battery pack, and feeding the battery pack data back to the data processing device, to enable the data processing device to determine a management mode for the battery pack based on the battery pack data.

Figure 4:
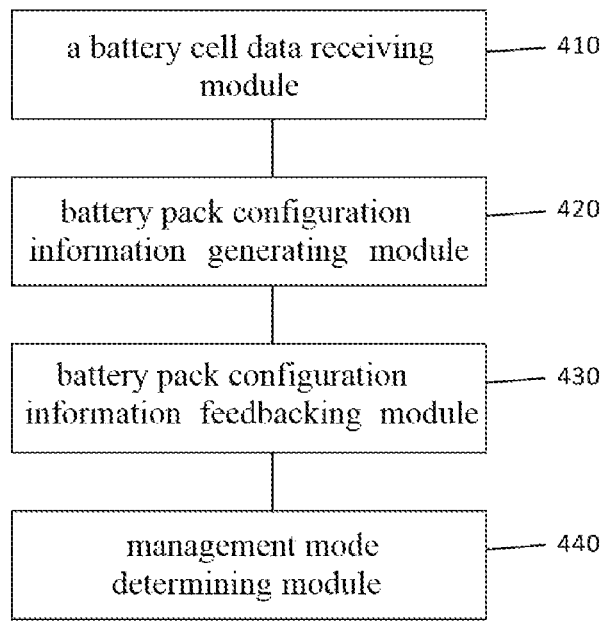
FIG. 4 is a module diagram of an apparatus for managing batteries according to another embodiment of this disclosure.

On the basis of the method for managing batteries corresponding to FIG. 2, a description is to be made to a battery management apparatus according to an embodiment of this disclosure. As shown in FIG. 4, the battery management apparatus comprises the following modules:

a battery cell data receiving module 410 for receiving battery cell data sent from a battery management device, which indicates the status of battery cells;

a battery pack configuration information generating module 420 for generating battery pack configuration information which specifies battery cells making up a battery pack, based on the battery cell data;

a battery pack configuration information feedbacking module 430 for feeding the battery pack configuration information back to the battery management device, to enable the battery management device to configure the battery cells into at least one battery pack based on the battery pack configuration information;

a management mode determining module 440 for determining, upon receipt of battery pack data indicating the status of the associated battery pack sent from the battery management device, a management mode for the battery pack based on the battery pack data.

On the basis of the method for managing batteries corresponding to FIG. 1, a description is to be made to a battery management device according to an embodiment of this disclosure. The battery management device may include a detection module, a data transmission module, a memory, and a processor.

The detection module is configured to acquire battery cell data and/or battery pack data. Specifically, the data of the corresponding component may be acquired by a corresponding sensor, a detailed description of which is omitted herein.

The data transmission module may be configured to perform communication with a data processing device. Preferably, the data transmission module may transmit wireless signals to the data processing device to implement the communication with the data processing device. Accordingly, the data transmission module may be configured to receive wireless signals sent from the data processing device. In practical applications, the data transmission module may also perform data transmission in a wired manner. There is no limitation in this respect.

In some embodiments, the data transmission module may be further configured to receive update parameters and update codes. The update parameters and update codes are for updating the program code of the battery management device so that the version upgrade of the battery management device can be implemented conveniently and quickly, and the processing capability of the device can be improved.

In this embodiment, the memory may be implemented in any suitable manner. For example, the memory may be a read-only memory, a mechanical hard disk, a solid-state hard disk, or a flash disk. In addition, the memory may store the battery cell data and/or the battery pack data and computer program instructions.

In this embodiment, the processor may be implemented in any suitable manner. For example, the processor may take the form of a microprocessor or a processor, as well as a computer-readable medium storing computer-readable program code (such as software or firmware) that can be executed by the (micro) processor, logic gates, switches, Application Specific Integrated Circuits (ASIC), programmable logic controller and embedded microcontroller, etc. The processor may execute the computer program instructions to implement the following steps: collecting battery cell data of respective battery cells, which indicates statuses of the battery cells; sending the battery cell data to a data processing device to enable the data processing device to determine a configuration of a battery pack based on the battery cell data; configuring the battery cells into at least one battery pack based on the battery pack configuration information received from the data processing device; acquiring battery pack data of the battery pack which indicates the status of the battery pack, and feeding the battery pack data back to the data processing device to enable the data processing device to determine a management mode for the battery pack based on the battery pack data.

On the basis of the method for managing batteries corresponding to FIG. 2, a description is to be made to a data processing device according to an embodiment of this disclosure. The data processing device may include a memory and a processor.

In this embodiment, the memory may be implemented in any suitable manner. For example, the memory may be a read-only memory, a mechanical hard disk, a solid-state hard disk, or a flash disk. The memory may store computer program instructions.

In this embodiment, the processor may be implemented in any suitable manner. For example, the processor may take the form of a microprocessor or a processor, as well as a computer-readable medium storing computer-readable program code (such as software or firmware) that can be executed by the (micro) processor, logic gates, switches, Application Specific Integrated Circuits (ASIC), programmable logic controller and embedded microcontroller, etc. The processor may execute the computer program instructions to implement the following steps: receiving battery cell data sent from a battery management device, which indicates statuses of the battery cells; generating, based on the battery cell data, battery pack configuration information, which specifies battery cells making up a battery pack; feeding the battery pack configuration information back to the battery management device to enable the battery management device to configure the battery cells into at least one battery pack based on the battery pack configuration information; determining, upon receipt of the battery pack data from the battery management device, a management mode for the battery pack, wherein the battery pack data indicates status for the battery pack.

Although the processes described above include a plurality of operations performed in a specific order, it should be understood that these processes may include more or fewer operations. These operations may be performed sequentially or in parallel (for example, with a parallel processor or a multi-threaded environment).

A description has been made by reference to flowcharts and/or block diagrams of methods, devices (systems), and computer program products according to the embodiments of this disclosure. It should be understood that each process and/or block in the flowcharts and/or block diagrams and the combination of processes and/or blocks in the flowcharts and/or block diagrams can be implemented by computer program instructions. These computer program instructions can be provided to the processor of a general-purpose computer, a special-purpose computer, an embedded processor, or other programmable data processing device to form a machine so that the instructions executed by the processor of the computer or other programmable data processing device achieve an apparatus for implementing the functions specified in one or more processes in the flowcharts and/or one or more blocks in the block diagrams.

These computer program instructions may also be stored in a computer-readable memory that can direct a computer or other programmable data processing device to operate in a specific manner, so that the instructions stored in the computer-readable memory achieve an article of manufacture including the instruction device, with the instruction device implementing the functions specified in one or more processes in the flowcharts and/or one or more blocks in the block diagrams.

These computer program instructions may also be loaded onto a computer or other programmable data processing device to enable the computer or other programmable device to perform a series of operations. In this way, the instructions executed on the computer or other programmable device may provide steps for implementing functions specified in one or more flows in the flowcharts and/or one or more blocks in the block diagrams.

In a typical configuration, the computing device may include one or more processors (CPUs), input/output interfaces, network interfaces, and memory.

The memory may include non-permanent memory, random access memory (RAM), and/or non-volatile memory in a computer-readable medium, such as read-only memory (ROM) or flash memory (flash RAM). Memory is an example of a computer-readable medium.

The computer-readable medium may include permanent and non-permanent, removable and non-removable medium, and may store information by any methods or technology. The information may be computer-readable instructions, data structures, program modules, or other data. Examples of the computer storage medium may include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, CD-ROM, digital versatile disc (DVD) or other optical storage, magnetic cassettes, disk storage or other magnetic storage devices or any other non-transmission media for storing information accessible to computing devices. According to the definition in this disclosure, computer-readable media does not include transitory medium, such as modulated data signals and carrier waves.

Those skilled in the art should understand that the embodiments of this disclosure can be provided as a method, a system, or a computer program product. Therefore, the embodiments of this disclosure may take the form of an entire hardware embodiment, an entire software embodiment, or an embodiment combining both software and hardware. Moreover, the embodiments of this disclosure may take the form of computer program products implemented on one or more computer-usable storage mediums (including but not limited to disk storage, CD-ROM, optical storage, etc.) containing computer-usable program codes.

The embodiments of this disclosure may be described in the general context of computer-executable instructions executed by a computer, such as program modules. Generally, program modules may include routines, programs, objects, components, data structures, etc., for performing specific tasks or implementing specific abstract data types. The embodiments of this disclosure may also be implemented in a distributed computing environment in which tasks are performed by remote processing devices connected through a communication network. Program modules in the distributed computing environment may be located in local and remote computer storage media, including storage devices.

The embodiments in this disclosure have been described progressively in that each embodiment is described by focusing on the differences from other embodiments, and reference may be made to the same or similar parts across the embodiments. In particular, descriptions of the system embodiments are relatively brief as they are similar to the method embodiments, and reference may be made to the method embodiments for relevant parts. In the description of this disclosure, terms "an embodiment", "some embodiments", "an example", "a specific example", or "some examples" etc. mean the specific feature, structure, material, or characteristic described in conjunction with the embodiment or example are included in at least one embodiment or example of this disclosure. In this disclosure, reference to these terms is not necessarily limited to the same embodiment or example. Moreover, the specific features, structures, materials, or characteristics described can be appropriately combined in one or more embodiments or examples. In addition, those skilled in the art can combine and merge different embodiments or examples and the features of the different embodiments or examples described in this disclosure, in the condition that no contradiction exists.

The above descriptions are only examples of the present disclosure and do not mean to limit the present disclosure. For those skilled in the art, this disclosure may have various modifications and alternations. Any modifications, equivalent alternatives, improvements, etc., made within the spirit and principle of this disclosure fall within the scope of the claims.

What is claimed is:

1. A method for managing batteries, comprising:
    collecting battery cell data for respective battery cells, which indicates statuses of the battery cells;
    sending the battery cell data to a data processing device to enable the data processing device to determine a configuration of a battery pack based on the battery cell data;
    configuring, upon receipt of battery pack configuration information from the data processing device, the battery cells into at least one battery pack based on the battery pack configuration information; and
    acquiring battery pack data for the battery pack, which indicates the status of the battery pack, and feeding the battery pack data back to the data processing device to enable the data processing device to determine a management mode for the battery pack based on the battery pack data,
    wherein the method further comprises: determining whether a management device of the battery pack has sufficient data access and capability to manage the battery pack, wherein the battery cell data and the battery pack data are sent to the data processing device for remote analysis and management by the data processing device based on a determining result that the management device of the battery pack does not have sufficient data access and capability to manage the battery pack, and wherein sending the battery cell data to the data processing device comprises sending the battery cell data to the data processing device via a wireless port, the battery pack configuration information including information received via the wireless port.

2. The method according to claim 1, wherein:
the battery cell data includes at least one of battery cell voltage, battery cell current, battery cell temperature, or battery cell location; and
the battery pack data includes at least one of battery level, battery health condition, battery power, or remaining charging time.

3. The method according to claim 1, wherein the data processing device is a cloud computing device.

4. An apparatus for managing batteries, comprising:
a battery cell data collecting module configured to collect battery cell data for respective battery cells, which indicates statuses of the battery cells;
a battery cell data sending module configured to send the battery cell data to a data processing device, to enable the data processing device to determine a configuration of a battery pack based on the battery cell data, wherein sending the battery cell data to the data processing device comprises sending the battery cell data to the data processing device via a wireless port;
a battery pack configuring module configured to configure, upon receipt of battery pack configuration information from the data processing device, the battery cells into at least one battery pack based on the battery pack configuration information, wherein the battery pack configuration information includes information received via the wireless port; and
a battery pack data acquiring module configured to acquire battery pack data for the battery pack, which indicates a status of the battery pack, and feed the battery pack data back to the data processing device to enable the data processing device to determine a management mode for the battery pack based on the battery pack data,
wherein the apparatus for managing batteries is configured to determine whether a management device of the battery pack has sufficient data access and capability to manage the battery pack, wherein the battery cell data and the battery pack data are sent to the data processing device for remote analysis and management by the data processing device based on a determining result that the management device of the battery pack does not have sufficient data access and capability to manage the battery pack.

5. The apparatus according to claim 4, wherein the data processing device is a cloud computing device.

6. A device for managing batteries, comprising a detection module, a data transmission module, a non-transitory computer-readable medium, and a processor, wherein:
the detection module is configured to acquire battery cell data and/or battery pack data;
the data transmission module is configured to communicate with a data processing device;
the non-transitory computer-readable medium is configured to store the battery cell data and/or the battery pack data; and the processor is configured to execute preset program instructions stored in the non-transitory computer-readable medium to implement steps of:
collecting battery cell data for respective battery cells, which indicates statuses of the battery cells;
sending the battery cell data to the data processing device to enable the data processing device to determine a configuration of a battery pack based on the battery cell data;
configuring, upon receipt of battery pack configuration information from the data processing device, the battery cells into at least one battery pack based on the battery pack configuration information;
acquiring battery pack data for the battery pack, which indicates the status of the battery pack, and feeding the battery pack data back to the data processing device, to enable the data processing device to determine a management mode for the battery pack based on the battery pack data,
wherein the device for managing batteries is configured to determine whether a management device of the battery pack has sufficient data access and capability to manage the battery pack, wherein the battery cell data and the battery pack data are sent to the data processing device for remote analysis and management by the data processing device based on a determining result that the management device of the battery pack does not have sufficient data access and capability to manage the battery pack, and
wherein sending the battery cell data to the data processing device comprises sending the battery cell data to the data processing device via a wireless port, the battery pack configuration information including information received via the wireless port.

7. The device, according to claim 6, wherein the data transmission module is further configured to receive update parameters and update codes, which are for updating a program code of the device.

8. The device according to claim 6, wherein the data processing device is a cloud computing device.

9. A method for managing batteries, comprising:
receiving battery cell data from a device for managing batteries, wherein the battery cell data describes statuses of battery cells, wherein the battery cell data is sent from the device for managing batteries via a wireless port;
generating battery pack configuration information based on the battery cell data, wherein the battery pack configuration information specifies battery cells for making up a battery pack;
feeding the battery pack configuration information back to the device for managing batteries, to enable the device for managing batteries to configure the battery cells into at least one battery pack based on the battery pack configuration information, wherein the battery pack configuration information includes information received via the wireless port; and
determining, upon receipt of battery pack data from the device for managing batteries, a management mode for the battery pack based on the battery pack data, wherein the battery pack data indicates a status of the battery pack,
wherein the device for managing batteries determines whether a management device of the battery pack has sufficient data access and capability to manage the battery pack, wherein the battery cell data and the battery pack data are sent to a data processing device for remote analysis and management by the data processing device based on a determining result that the management device of the battery pack does not have sufficient data access and capability to manage the battery pack.

10. The method according to claim 9, wherein determining the management mode for the battery pack based on the battery pack data comprises:
estimating a battery failure based on the battery pack data, and sending warning information to a user to notify the battery failure,
wherein the battery failure includes at least one of low battery level or battery thermal runaway.

11. The method according to claim 9, wherein the data processing device is a cloud computing device.

12. An apparatus for managing batteries, comprising:
a battery cell data receiving module configured to receive battery cell data from a device for managing batteries, wherein the battery cell data describes statuses of battery cells, wherein the battery cell data is sent from the device for managing batteries via a wireless port;
a battery pack configuration information generating module configured to generate battery pack configuration information based on the battery cell data, wherein the battery pack configuration information specifies battery cells for making up a battery pack;
a battery pack configuration information feedbacking module configured to feed the battery pack configuration information back to the device for managing batteries, to enable the device for managing batteries to configure the battery cells into at least one battery pack based on the battery pack configuration information, wherein the battery pack configuration information includes information received via the wireless port; and
a management mode determining module configured to determine, upon receipt of battery pack data from the device for managing batteries, a management mode for the battery pack based on the battery pack data, wherein the battery pack data indicates the status of the battery pack,
wherein the device for managing batteries determines whether a management device of the battery pack has sufficient data access and capability to manage the battery pack, wherein the battery cell data and the battery pack data are sent to the apparatus for managing batteries for remote analysis and management by the apparatus for managing batteries based on a determining result that the management device of the battery pack does not have sufficient data access and capability to manage the battery pack.

13. The apparatus according to claim 12, wherein the apparatus for managing batteries is a cloud computing device.

14. A data processing device comprising a non-transitory computer-readable medium and a processor, wherein
the non-transitory computer-readable medium is configured to store computer program instructions;
the processor is configured to execute the computer program instructions stored in the non-transitory computer-readable medium to implement steps of:
receiving battery cell data from a device for managing batteries, wherein the battery cell data describes statuses of battery cells, wherein the battery cell data is sent from the device for managing batteries via a wireless port;
generating battery pack configuration information based on the battery cell data, wherein the battery pack configuration information specifies battery cells for making up a battery pack;
feeding the battery pack configuration information back to the device for managing batteries, to enable the device for managing batteries to configure the battery cells into at least one battery pack based on the battery pack configuration information, wherein the battery pack configuration information includes information received via the wireless port; and
determining, upon receipt of battery pack data from the device for managing batteries, a management mode for the battery pack based on the battery pack data, wherein the battery pack data indicates a status of the battery pack,
wherein the device for managing batteries determines whether a management device of the battery pack has sufficient data access and capability to manage the battery pack, wherein the battery cell data and the battery pack data are sent to the data processing device for remote analysis and management by the data processing device based on a determining result that the management device of the battery pack does not have sufficient data access and capability to manage the battery pack.

15. The data processing device according to claim 14, wherein the data processing device is a cloud computing device.

* * * * *